Patented June 8, 1954

2,680,741

UNITED STATES PATENT OFFICE 2,680,741

PROCESS FOR PREPARING 3-ARYL-2,4-(1H, 3H)-QUINAZOLINEDIONES AND THEIR NITROGEN HETEROCYCLIC ANALOGS

Walter W. Gilbert, Wilmington, Del., assignor to E. I. du Pont de Nemours and Company, Wilmington, Del., a corporation of Delaware No Drawing. Application March 7, 1952,
Serial No. 275,457

12 Claims. (Cl. 260—260)

This invention relates to a new high pressure synthesis and to certain of the products obtained thereby. More particularly this invention relates to a new process for the preparation of quinazolinediones and their nitrogen heterocyclic analogs and to certain new 3-aryl-2,4-(1H,3H)-quinazolinediones.

British Patent 353,464 describes the preparation of symmetrical diarylureas by reacting primary aromatic amines with carbon dioxide at 130° C. and 50 atmospheres pressure in the presence of aluminum chloride. Under the conditions disclosed quinazolinediones are not obtained. No high pressure synthesis employing carbon dioxide as a reactant has heretofore been disclosed for the production of quinazolinediones.

It is an object of this invention to provide a new process for the preparation of quinazolinediones and their nitrogen heterocyclic analogs. A further object is to provide a new route to quinazolinediones and their nitrogen heterocyclic analogs through a high pressure synthesis employing carbon dioxide as a reactant. Another object is to provide certain new 3-aryl-2,4-(1H,3H)-quinazolinediones. Other objects will appear hereinafter.

The objects of this invention are accomplished by reacting, at a temperature above 175° C. and at a pressure of at least 3300 atmospheres, carbon dioxide and a mononuclear aromatic primary monoamine having at most one ring member other than carbon and that a nitrogen atom and having at least one of the positions ortho to the amino group unsubstituted with any nuclear substituents other than the primary amino group being solely alkyl, alkoxy or carboxy, and then separating the obtained quinazolinedione or its nitrogen heterocyclic analog from the reaction mixture. It has now been found that if the reaction is conducted at temperatures above 175° C. and at a pressure of at least 3300 atmospheres, there are obtained quinazolinediones or their nitrogen heterocyclic analogs as the principal products, even in the absence of catalysts.

The mononuclear aromatic primary monoamine reactants have at most one ring member other than carbon and that a nitrogen atom and contain hydrogen in at least one of the positions ortho to the amino group with any nuclear substituents other than the primary amino group being solely alkyl, alkoxy or carboxy. It is critical that the aromatic monoamine have at least one of the positions ortho to the amino group unsubstituted, that the amino group be primary, and that the aromatic group be mononuclear. The aromatic group can be carbocyclic or it can be nitrogen heterocyclic. Thus, the mononuclear aromatic primary monoamine can be a mononuclear aryl primary monoamine or a pyridine primary monoamine, containing hydrogen in at least one of the positions ortho to the amino group with any nuclear substituents other than the primary amino group being solely alkyl, alkoxy or carboxy. Examples of the mononuclear aryl primary monoamines are aniline and nuclear substituted anilines containing hydrogen in at least one of the positions ortho to the amino group with nuclear substituents other than the primary amino group being solely alkyl, alkoxy or carboxy, such as ortho- and para-toluidines, 4 - decyloxy - 1 - aminobenzene, 2 - amino - 1,4 - dimethylbenzene, 4-methoxy-1-aminobenzene, 2-amino-4-decylbenzene, 4-butyl-1-aminobenzene, 3-octadecyl-1-aminobenzene, anthranilic acid, and the like. Examples of the pyridine primary monoamines are the aminopyridines and nuclear substituted aminopyridines having hydrogen in at least one of the positions ortho to the amino group with nuclear substituents other than the primary amino group being solely alkyl, alkoxy, or carboxy, such as 2-aminopyridine, 4-methyl-2-aminopyridine, and the like. The preferred substituted mononuclear aromatic primary monoamines are those in which the substituents are either carboxy or alkyl or alkoxy groups of 1 to 18 carbon atoms.

In accordance with this invention, new compositions of matter are provided which are quinazolinediones having the general structural formula:

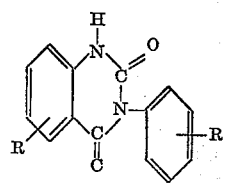

in which R is alkyl or alkoxy, especially lower alkyl and alkoxy groups containing from 1 to 7 carbon atoms, such as, methyl, ethyl, pentyl, and heptyl and the corresponding alkoxy radicals. Such novel quinazolinediones are prepared from toluidines, such as ortho- and para-toluidines, as in Examples VI and VII, and from methoxy-aminobenzenes such as 4-methoxy-1-amino-benzene.

As generally operated, a pressure reactor is charged with weighed amounts of the mononuclear aromatic primary monoamine and liquid carbon dioxide, the molar ratio of carbon dioxide to amine preferably being above 1:1. The mixture is pressured to the desired level by application of external pressure and heated to the selected reaction temperature. After the system has reached an essentially static pressure state, the reactor is permitted to cool, unreacted carbon dioxide is vented off, and the contents are discharged. The desired quinazolinedione is isolated from the reaction mixture by methods well known to those skilled in the art.

The examples which follow are submitted to illustrate and not to limit this invention:

Example I

A stainless steel pressure reactor which contains 4.08 g. of aniline is pressured with 2.39 g. of carbon dioxide. The reaction vessel is then heated to 200° C. for 14 hours at a maximum pressure slightly in excess of 8500 atm. At the end of this time the reaction vessel is cooled, and the unreacted carbon dioxide is vented. The reaction product is washed from the vessel with ether and collected on a filter. The crude 3-phenyl-2,4-(1H,3H)-quinazolinedione, M. P. 267–268° C., weighs 3.37 g., corresponding to a 64% conversion. Recrystallization from a mixture of ethanol and benzene gives a white crystalline product, M. P. 275°–280° C.

Example II

A stainless steel pressure reactor is charged with 4.23 g. of aniline and pressured with a gas mixture containing 2.52 g. of carbon dioxide and 0.32 g. of nitrogen. The reaction vessel is then heated to 250° C. for 13 hours at a maximum pressure of 3300 atm. The reactor is cooled, and the residual gas is vented. An ether suspension of the products is extracted with 2N hydrochloric acid to remove unreacted aniline and then with 5% sodium hydroxide. 3-phenyl-2,4-(1H,3H)-quinazolinedione (ca. 0.17 g.) is precipitated from the sodium hydroxide extract by saturating the solution with carbon dioxide or by acidifying the solution with a mineral acid. From the extracted ether layer is recovered ca. 0.12 g. of sym.-diphenylurea.

Example III

The experiment described in Example I is repeated using the following charge: aniline, 3.03 g.; ethanol, 1.57 g.; carbon dioxide, 3.80 g.; nitrogen, 0.35 g. The pressure vessel is heated to 200° C. for 13 hours at a maximum pressure of 8500 atm. The crude 3-phenyl-2,4-(1H,3H)-quinazolinedione recovered weighs 0.77 g.

Example IV

The experiment described in Example I is repeated with the following charge: aniline, 4.06 g.; water, 0.75 g.; sodium carbonate, 1.00 g.; carbon dioxide, 3.27 g. The charge is heated to 250° C. for 13 hours at a maximum pressure of 8500 atm. The recovered 3-phenyl-2,4-(1H,3H)-quinazolinedione weighs 3.72 g.

Example V

A stainless steel pressure vessel is charged with 3.14 g. of aniline, 1.00 g. of anhydrous aluminum chloride, 4.00 g. of carbon dioxide, and 0.24 g. of nitrogen. This charge is heated to 200° C. for 14 hours, at a maximum pressure of 8500 atm. The reaction product is suspended in a mixture of benzene and ether and is extracted with 2N hydrochloric acid and then with 5% sodium hydroxide solution. From the sodium hydroxide solution there is recovered 1.55 g. of 3-phenyl-2,4-(1H,3H)-quinazolinedione by precipitation with carbon dioxide. The extracted organic layer is concentrated to yield 0.43 g. of a crude solid, M. P. 43–47° C.

Example VI

A charge consisting of 4.00 g. of o-toluidine, 3.33 g. of carbon dioxide, and 0.36 g. of nitrogen is heated in a pressure vessel to 250° C. for 13 hours at a maximum pressure of 8500 atm. The reaction products are suspended in ether and are extracted with 2N hydrochloric acid and then with 5% sodium hydroxide solution. The sodium hydroxide solution is acidified with hydrochloric acid to precipitate 0.76 g. of 3-o-tolyl-8-methyl-2,4-(1H,3H)-quinazolinedione, M. P. 214–220° C. The crude alkali-soluble material may be purified by recrystallization from a mixture of methanol and benzene or by sublimation under reduced pressure. The purified 3-o-tolyl-8-methyl-2,4-(1H,3H)-quinazolinedione melts at 224–225° C.

Anal.—Calcd. for $C_{16}H_{14}N_2O_2$: C, 72.18; H, 5.30; N, 10.52. Found: C, 72.30; H, 5.48; N, 10.57, 10.53.

The extracted ether layer is concentrated to yield a small amount of sym.-di-o-tolylurea, M. P. 257–258° C.

Example VII

The experiment of Example VI is repeated using 8.00 g. of p-toluidine, 8.03 g. of carbon dioxide, and 0.20 g. of nitrogen. Crude 3-p-tolyl-6-methyl-2,4-(1H,3H)-quinazolinedione weighing 3.13 g. is recovered after the products have been separated. After recrystallization from a mixture of methanol and benzene or purification by sublimation at reduced pressure, there is obtained 3-p-tolyl-6-methyl-2,4-(1H,3H)-quinazolinedione melting at 288–290° C.

Anal.—Calcd. for $C_{16}H_{14}N_2O_2$: C, 72.18; H, 5.30; N, 10.52. Found: C, 71.89; H, 5.37; N, 10.44, 10.47.

Example VIII

A high pressure reactor is charged, under a blanket of oxygen-free nitrogen, with 50 g. of aniline and 10 ml. of 8–10 mesh zinc tungstite catalyst, prepared as described in the co-pending application of H. R. Arnold and J. E. Carnahan, U. S. patent application S. N. 208,662, filed January 30, 1951. The charged reactor is closed, evacuated, placed in a shaker box, connected to a source of high pressure carbon dioxide and filled with carbon dioxide. The mixture is shaken and heated at 325° C. under 3000 atmospheres of carbon dioxide pressure for 3 hours. The reactor is allowed to cool, bled of excess carbon dioxide, and the contents discharged and steam distilled. Sixteen grams of unreacted aniline are recovered. The residue, which is not steam distillable is evaporated to dryness and the solid recrystallized from alcohol. The major portion of the product, which amounts to 175 mg., is 3-phenyl-2,4-(1H,3H)-quinazolinedione melting at 277° C. to 278° C. The mixed melting point with an authentic sample of 3-phenyl-2,4-(1H,3H)-quinazolinedione (M. P. 275° C.) is 274° C. to 276° C., as determined on the Maquenne block.

Anal.—Calcd. for $C_{14}H_{10}O_2N_2$: C, 70.57%; H, 4.23%; N, 11.76%. Found: C, 70.77%; C, 4.46%; N, 11.51%.

In the right column of the table below are listed the quinazolinediones, or their nitrogen heterocyclic analogs, which are obtained by substituting the amines enumerated in the left column for the amine of Example VI in the process of Example VI:

| Amine | Product |
|---|---|
| 2-amino-1,4-dimethylbenzene | 3-(2,5-dimethylphenyl)-5,8-dimethyl-2,4-(1H,3H)-quinazolinedione. |
| 4-methoxy-1-aminobenzene | 3-p-methoxyphenyl-6-methoxy-2,4-(1H,3H)-quinazolinedione. |
| Anthranilic acid | 3-phenyl-2,4-(1H,3H)-quinazolinedione. |
| 2-aminopyridine | 3-(2-pyridyl)-pyrido(2,3-d)pyrimidine-2,4-(1H,3H)-dione. |
| 2-amino-4-methylpyridine | 3-[2(4-methylpyridyl)]-5-methyl-pyrido-(2,3-d)pyrimidine-2,4-(1H,3H)-dione. |
| 4-butyl-1-aminobenzene | 3-p-butylphenyl-6-butyl-2,4-(1H,3H)-quinazolinedione. |
| 3-decyl-1-aminobenzene | 3-(3-decylphenyl)-5-decyl-2,4-(1H,3H)-quinazolinedione. |
| 3-octadecyl-1-aminobenzene | 3-(3-octadecylphenyl)-5-octadecyl-2,4-(1H,3H)-quinazolinedione. |

The examples have illustrated preferred embodiments and are not to be construed as limitations of the invention.

The process is operable at temperatures above 175° C. Temperatures in excess of 350° C. are not used because secondary reactions begin to predominate, which operate to reduce the yield of desired quinazolinedione. The most useful temperature range from the standpoint of yield of desired product and reaction rate is 200°–325° C., and the process is therefore generally carried out in this range.

Pressure is a critical variable. At pressures below 3300 atm., the reaction, in the absence of a dehydration catalyst, does not produce quinazolinediones but it yields symmetrical diarylureas, as follows:

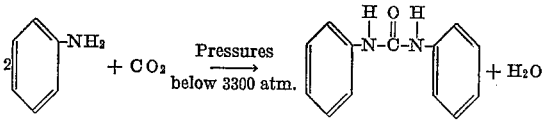

At pressures of at least 3300 atm. the wholly different reaction of quinazolinedione formation occurs, as follows:

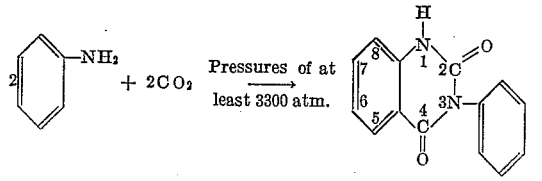

Generally the yield of desired quinazolinedione increases rapidly as the pressure increases beyond the threshold value of approximately 3300 atm., and the increase is particularly rapid beyond 4000 atm. Especially good yields are obtained at pressures above 6000 atm.

For the best results, it is desirable to correlate temperature and pressure. Generally, the higher the pressure the lower the temperature requirements of the reaction and vice versa.

The amine and carbon dioxide reactants combine in 1:1 molar ratios. However in practice a large excess of carbon dioxide is used and the unreacted portion is bled-off at the end of the reaction. The usual practice is to pressure with the carbon dioxide to a predetermined pressure and to permit the reaction to proceed until there is essentially no further pressure drop. The time required to reach this state depends upon the operating conditions and the particular amine used. As a rule the higher the pressure and temperature the shorter the reaction time. In practice the reaction is permitted to take place for at least 2 hours. Extension of the reaction time beyond 20 hours is not conducive to better yields of desired product, and this therefore represents a practical upper time limit of reaction.

As illustrated by Examples IV and V materials which have a basic or an acid reaction can be present in the reaction system but these generally have no noticeable effect on the pressure requirements of the reaction. Unlike these basic and acidic materials, substances classed as dehydration catalysts do seem to lower the threshold pressure for quinazolinedione formation. As shown by Example VIII a quinazolinedione is formed in the presence of these materials at pressures as low as 3000 atm. In place of the specific dehydration catalyst of the example there can be used zinc chromite, silica-alumina-chromia, basic aluminum phosphate, zinc molybdite, nickel molybdite, and materials corresponding in composition to $Fe_2O_3.K_2CO_3.Cr_2O_3$, and $$Cr_2O_3.SiO_2$$

and the like.

The process is usually carried out in the absence of added reaction medium. If desired a normally liquid reaction medium can be used to provide better contact between the reactants and to dissipate the heat of reaction. Suitable media are cyclohexane, isooctane, benzene, ether, ethanol, water, and the like.

The quinazolinediones are useful intermediates for pharmaceuticals and insecticides, and for conversion to substituted anthranilic acids of interest in dyestuffs, etc.

As many apparently widely different embodiments of this invention may be made without departing from the spirit and scope thereof, it is to be understood that this invention is not limited to the specific embodiments thereof except as defined in the appended claims.

I claim:

1. A process which comprises reacting, at a temperature of at least 175° C. and at a pressure of at least 3300 atmospheres, carbon dioxide and a mononuclear aromatic primary monoamine selected from the class consisting of mononuclear aryl primary monoamines and mononuclear pyridine primary monoamines, said mononuclear aromatic primary monoamine containing hydrogen in at least one of the positions ortho to the amino group with any nuclear substituents in addition to the primary amino group being selected from the class consisting of alkyl, alkoxy and carboxy, and separating from the reaction mixture a compound selected from the class consisting of 3-aryl-2,4-(1H,3H)-quinazolinediones and their nitrogen heterocyclic analogs.

2. A process as set forth in claim 1 in which the temperature is from 175° C. to 350° C. and the pressure is at least 4000 atmospheres.

3. A process as set forth in claim 1 in which the temperature is from 200° C. to 325° C.

4. A process as set forth in claim 1 in which the pressure is at least 6000 atmospheres.

5. A process as set forth in claim 1 in which the temperature is from 200° C. to 325° C. and the pressure is at least 8500 atmospheres.

6. A process for the preparation of 3-aryl-2,4-(1H,3H)-quinazolinediones which comprises reacting, at a temperature of at least 175° C. and at a pressure of at least 3300 atmospheres, carbon dioxide and a mononuclear aryl primary monoamine containing hydrogen in at least one of the positions ortho to the amino group with any nuclear substituents in addition to the primary amino group being selected from the class consisting of alkyl, alkoxy and carboxy, and separating a 3-aryl-2,4-(1H,3H)-quinazolinedione from the reaction mixture.

7. A process for the preparation of 3-aryl-2,4-(1H,3H)-quinazolinediones which comprises reacting, at a temperature of at least 175° C. and at a pressure of at least 3300 atmospheres, carbon dioxide and a nuclear-substituted aniline containing hydrogen in at least one of the positions ortho to the amino group and having as the sole nuclear substituents the primary amino group and at least one member selected from the class consisting of alkyl, alkoxy and carboxy, and separating a 3-aryl-2,4-(1H,3H)-quinazolinedione from the reaction mixture.

8. A process for the preparation of 3-phenyl-2,4-(1H,3H)-quinazolinedione which comprises reacting, at a temperature of at least 175° C. and at a pressure of at least 3300 atmospheres, carbon dioxide and aniline, and separating 3-phenyl-2,4-(1H,3H)-quinazolinedione from the reaction mixture.

9. A process for the preparation of 3-aryl-2,4-(1H,3H)-quinazolinediones which comprises reacting, at a temperature of at least 175° C. and at a pressure of at least 3300 atmospheres, carbon dioxide and a nuclear-substituted aniline containing hydrogen in at least one of the positions ortho to the amino group and having as the sole nuclear substituents the primary amino group and at least one alkyl group, and separating a 3-aryl-2,4-(1H,3H)-quinazolinedione from the reaction mixture.

10. A process for the preparation of a 3-tolyl-methyl-2,4-(1H,3H)-quinazolinedione which comprises reacting, at a temperature of at least 175° C. and at a pressure of at least 3300 atmospheres, carbon dioxide and a toluidine, and separating a 3-tolyl-methyl-2,4-(1H,3H)-quinazolinedione from the reaction mixture.

11. A process for the preparation of 3-aryl-2,4-(1H,3H)-quinazolinediones which comprises reacting, at a temperature of at least 175° C. and at a pressure of at least 3300 atmospheres, carbon dioxide and a nuclear-substituted aniline containing hydrogen in at least one of the positions ortho to the amino group and having as the sole nuclear substituents the primary amino group and at least one alkoxy group, and separating a 3-aryl-2,4-(1H,3H)-quinazolinedione from the reaction mixture.

12. A process for the preparation of 3-p-methoxyphenyl-6-methoxy-2,4-(1H,3H)-quinazolinedione which comprises reacting, at a temperature of at least 175° C. and at a pressure of at least 3300 atmospheres, carbon dioxide and 4-methoxy-1-aminobenzene, and separating 3-p-methoxyphenyl-6-methoxy-2,4-(1H,3H)-quinazolinedione from the reaction mixture.

References Cited in the file of this patent

Hackh, Chemical Dictionary (third ed.), pp. 412 and 108 (1944), The Blakeston Co., Philadelphia, Pa.

Jacini, Gazz. Chim. Ital. 73, 85–8 (1943).

Deck et al., J. Am. Chem. Soc. 55, 4986–91 (1933).